(12) United States Patent
Bedeschi et al.

(10) Patent No.: US 11,718,048 B2
(45) Date of Patent: Aug. 8, 2023

(54) METHOD FOR PROVIDING WHEELS FOR MOTOR VEHICLES, AND ASSOCIATED WHEELS

(71) Applicant: RI-BA COMPOSITES S.R.L., Faenza (IT)

(72) Inventors: Andrea Bedeschi, Faenza (IT); Tobias Furst, Karlsruhe (DE); Philipp Rosenberg, Karlsruhe (DE)

(73) Assignee: BUCCI COMPOSITES S.P.A., Faenza (IT)

( * ) Notice: Subject to any disclaimer, the term of this patent is extended or adjusted under 35 U.S.C. 154(b) by 938 days.

(21) Appl. No.: 16/489,954

(22) PCT Filed: Mar. 7, 2017

(86) PCT No.: PCT/IT2017/000046
§ 371 (c)(1),
(2) Date: Aug. 29, 2019

(87) PCT Pub. No.: WO2018/163220
PCT Pub. Date: Sep. 13, 2018

(65) Prior Publication Data
US 2020/0070440 A1 Mar. 5, 2020

(51) Int. Cl.
*B29C 70/48* (2006.01)
*B29C 70/30* (2006.01)
(Continued)

(52) U.S. Cl.
CPC ............ *B29C 70/48* (2013.01); *B29C 70/304* (2021.05); *B60B 3/10* (2013.01); *B60B 5/02* (2013.01);
(Continued)

(58) Field of Classification Search
CPC ... B29C 70/48; B29C 70/304; B29C 99/0032; B29L 2031/32; B60B 2310/204; B60B 2360/3416
See application file for complete search history.

(56) References Cited

U.S. PATENT DOCUMENTS 3,369,843 A 2/1968 Prew
4,583,933 A 4/1986 Woelfel
(Continued)

FOREIGN PATENT DOCUMENTS

CN 103974834 A 8/2014
CN 103987513 A 8/2014
(Continued)

OTHER PUBLICATIONS

Machine translation of CN 106182814 A dated Dec. 2016. (Year: 2016).*

(Continued)

*Primary Examiner* — Robert B Davis
(74) *Attorney, Agent, or Firm* — Cantor Colburn LLP

(57) ABSTRACT

A method for providing motor vehicle wheels made of composite material based on carbon fiber includes the steps of dividing each wheel into a plurality of portions having small dimensions; providing a a first portion with the terminal edges designed to mate with corresponding edges of a respective second portion; mating the portions, arranging them subsequently within a respective mold whose shape and dimensions are conjugate with respect to those of the wheel to be manufactured; and bringing the mold and its contents to a predefined temperature. The method further includes injecting into the mold a resin in the liquid state, the resin being injected at high pressure and high temperature, forming the matrix of the composite that constitutes the wheel; maintaining the pressure and temperature of the mold within predefined ranges for a time interval that is required (Continued)

for the at least partial cross-linking of the resin; and extracting the wheel from the mold.

6 Claims, 6 Drawing Sheets

(51) Int. Cl.
  *B60B 3/10* (2006.01)
  *B60B 5/02* (2006.01)
  B29K 101/10 (2006.01)
  B29K 307/04 (2006.01)
  B29L 31/32 (2006.01)
(52) U.S. Cl.
  CPC ...... *B29K 2101/10* (2013.01); *B29K 2307/04* (2013.01); *B29L 2031/32* (2013.01); *B60B 2310/204* (2013.01); *B60B 2360/3416* (2013.01); *B60B 2900/111* (2013.01); *B60B 2900/112* (2013.01); *B60B 2900/113* (2013.01); *B60B 2900/311* (2013.01)

(56) References Cited

U.S. PATENT DOCUMENTS

| | | |
|---|---|---|
| 4,721,342 A | 1/1988 | Daniels et al. |
| 2015/0360509 A1 | 12/2015 | Werner et al. |

FOREIGN PATENT DOCUMENTS

| | | | | |
|---|---|---|---|---|
| CN | 104023953 A | | 9/2014 | |
| CN | 104968485 A | | 10/2015 | |
| CN | 105579246 A | | 5/2016 | |
| CN | 106182814 A | * | 12/2016 | |
| DE | 3637214 A1 | | 5/1988 | |
| DE | 102013212571 A1 | * | 7/2014 | ............ B29B 11/16 |
| WO | 2014061002 A1 | | 4/2014 | |

OTHER PUBLICATIONS

Machine translation of DE 102013212571 A1 dated Jul. 2014. (Year: 2014).*
International Search Report dated Nov. 13, 2017 re: Application No. PCT/IT2017/000046, pp. 1-4, citing: US 2015/360509 A1, WO 2014/061002 A1, DE 36 37 214 A1, U.S. Pat. No. 3,369,843 A, U.S. Pat. No. 4,583,933 A and U.S. Pat. No. 4,721,342 A.
Written Opinion dated Nov. 13, 2017 re: Application No. PCT/IT2017/000046, pp. 1-6, citing: US 2015/360509 A1, WO 2014/061002 A1, DE 36 37 214 A1, U.S. Pat. No. 3,369,843 A, U.S. Pat. No. 4,583,933 A and U.S. Pat. No. 4,721,342 A.

* cited by examiner

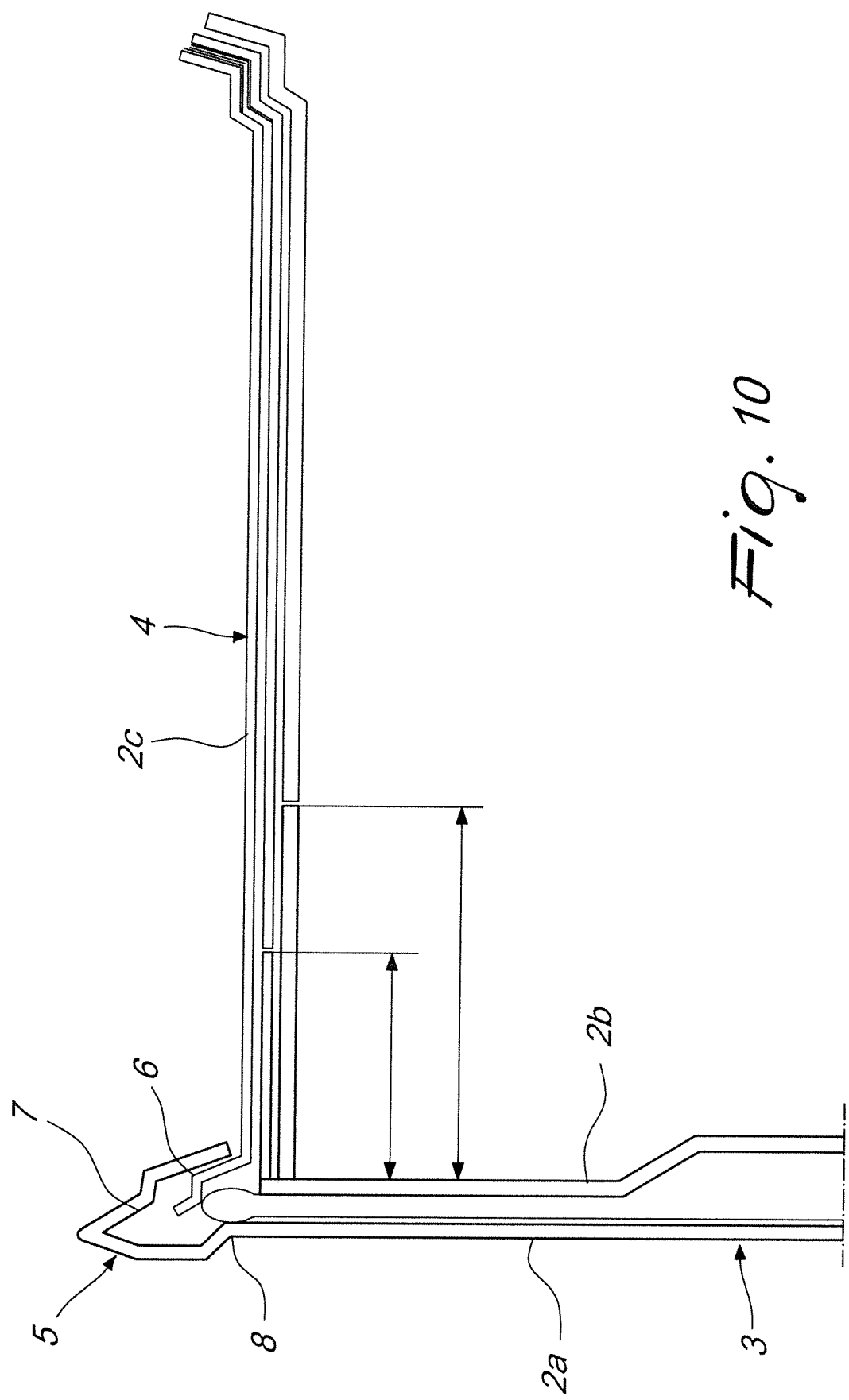

METHOD FOR PROVIDING WHEELS FOR MOTOR VEHICLES, AND ASSOCIATED WHEELS

TECHNICAL FIELD

The present disclosure relates to a method for providing wheels for motor vehicles (and vehicles in general) and to wheels manufactured according to this method.

BACKGROUND

Some types of motor vehicle, particularly cars, ensure considerable performance in terms of speed and acceleration.

Of course, for an equal power of the engine, it is possible to achieve a higher performance with vehicles having a limited mass, since they can be accelerated (or decelerated) more easily (they have a lower inertia).

For this reason it is known to resort to wheels, on which tires are fitted, which are made of light alloys (in particular aluminum alloys and magnesium alloys) and/or composite materials based on carbon fiber, which have excellent mechanical properties and an extremely low weight.

While the manufacture of alloy wheels is by now completely industrialized, thus allowing to obtain uniform series of products with high mechanical performance, modest weight and pleasant and original design, wheels made of composite materials are manufactured according to essentially handcraft criteria.

Obviously, handcraft manufacture renders the quality of each item dependent upon the skill of the operator, and this is fully the contrary of the need to have uniform series of wheels with extremely constant and precise mechanical performance and dimensional parameters.

Furthermore, the contribution of qualified and specialized labor entails high production costs, which affect the final cost of each wheel.

Wheels made of composite material based on carbon fiber, while ensuring a mechanical performance and low weight that are substantially unattainable with alloy wheels, are not particularly widespread due to their high production cost.

SUMMARY

The aim of the present disclosure is to solve the problems described above, by devising a method for providing motor vehicle wheels made of composite material based on carbon fiber of a fully industrialized type.

Within this aim, the disclosure proposes a method for providing motor vehicle wheels made of composite material based on carbon fiber that entails a minimum contribution of specialized labor.

The disclosure also proposes a method for providing motor vehicle wheels made of composite material based on carbon fiber that ensures high constancy of the mechanical properties and dimensions of each production batch.

The disclosure proposes motor vehicle wheels made of composite material based on carbon fiber that have a modest weight.

The disclosure further proposes motor vehicle wheels made of composite material based on carbon fiber that have high rigidity and optimum mechanical performance.

The disclosure devises a method for providing motor vehicle wheels that has a high productivity.

The present disclosure further devises a method for providing motor vehicle wheels and corresponding wheels that have modest costs, are relatively simple to provide in practice and are safe in application.

This aim and these and other advantages which will become better apparent hereinafter are achieved by providing a method for providing motor vehicle wheels made of composite material based on carbon fiber, which includes the following steps:

dividing, during design, each wheel into a plurality of portions having small dimensions;

providing, with a raw material constituted mainly by carbon fibers with a predefined orientation, at least one first portion with the terminal edges designed to mate with corresponding edges of at least one respective second portion that has a contour that is conjugate and complementary with respect to the contour of the edges of the at least one respective first portion;

mating said portions, arranging them subsequently within a respective mold whose shape and dimensions are conjugate with respect to those of the wheel to be manufactured;

bringing the mold and its contents to a predefined temperature;

injecting into the mold a resin in the liquid state, said resin being injected at high pressure and high temperature for its diffusion in all the portions and through all the interface surfaces between them, forming the matrix of the composite that constitutes the wheel;

maintaining the pressure and temperature of the mold within predefined ranges for a time interval that is required for the at least partial cross-linking of the resin;

extracting the wheel from the mold.

This aim and these advantages are also achieved by providing means of motor vehicle wheels of the type preferably made of composite material based on carbon fiber and provided with a plurality of substantially radial spokes mated with a substantially tubular body designed to accommodate the tire, characterized in that it is constituted by a plurality of distinct portions the contiguous edges of which are mutually imbricated, portions impregnated by a resin matrix that is distributed uniformly without discontinuity.

BRIEF DESCRIPTION OF THE DRAWINGS

Further characteristics and advantages of the disclosure will become better apparent from the description of a preferred but not exclusive embodiment of the method for providing motor vehicle wheels and of the associated wheels according to the disclosure, illustrated by way of nonlimiting example in the accompanying drawings, wherein:

FIG. 10 is a schematic side view of a detail of the wheel according to the disclosure.

DETAILED DESCRIPTION OF THE DRAWINGS

Figure 1:
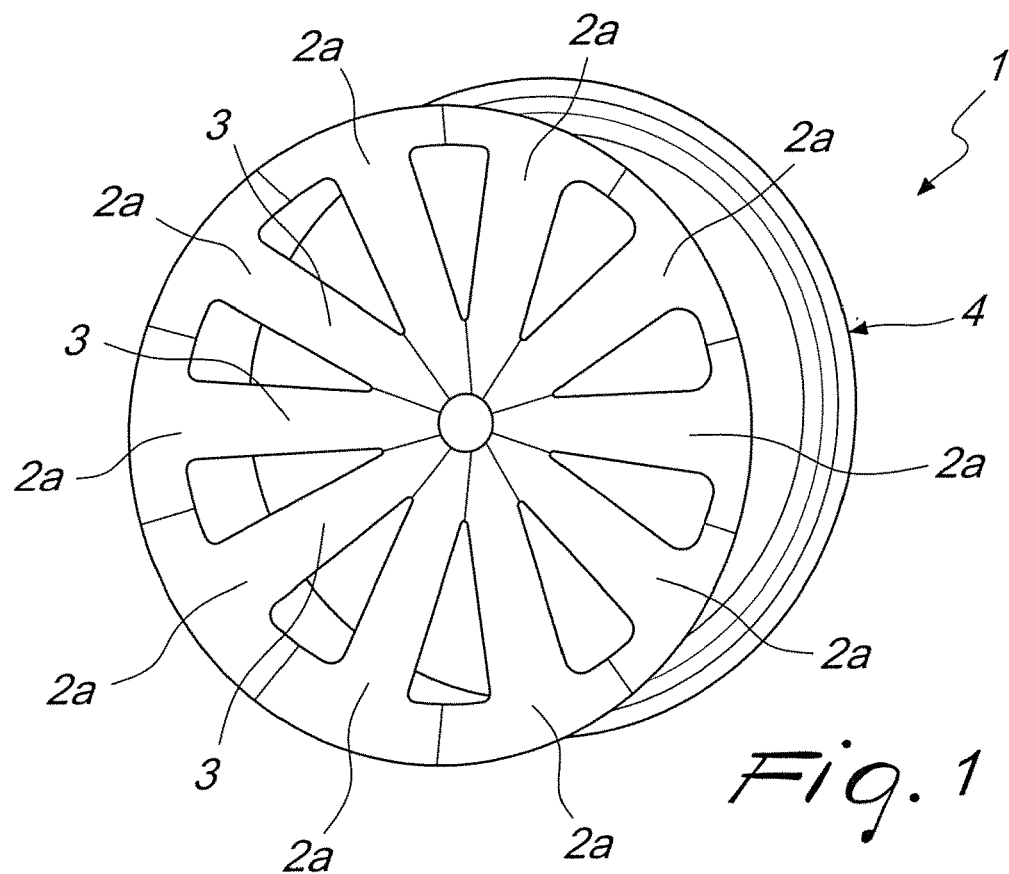
FIG. 1 is a front perspective view of a wheel according to the disclosure.
Figure 2:
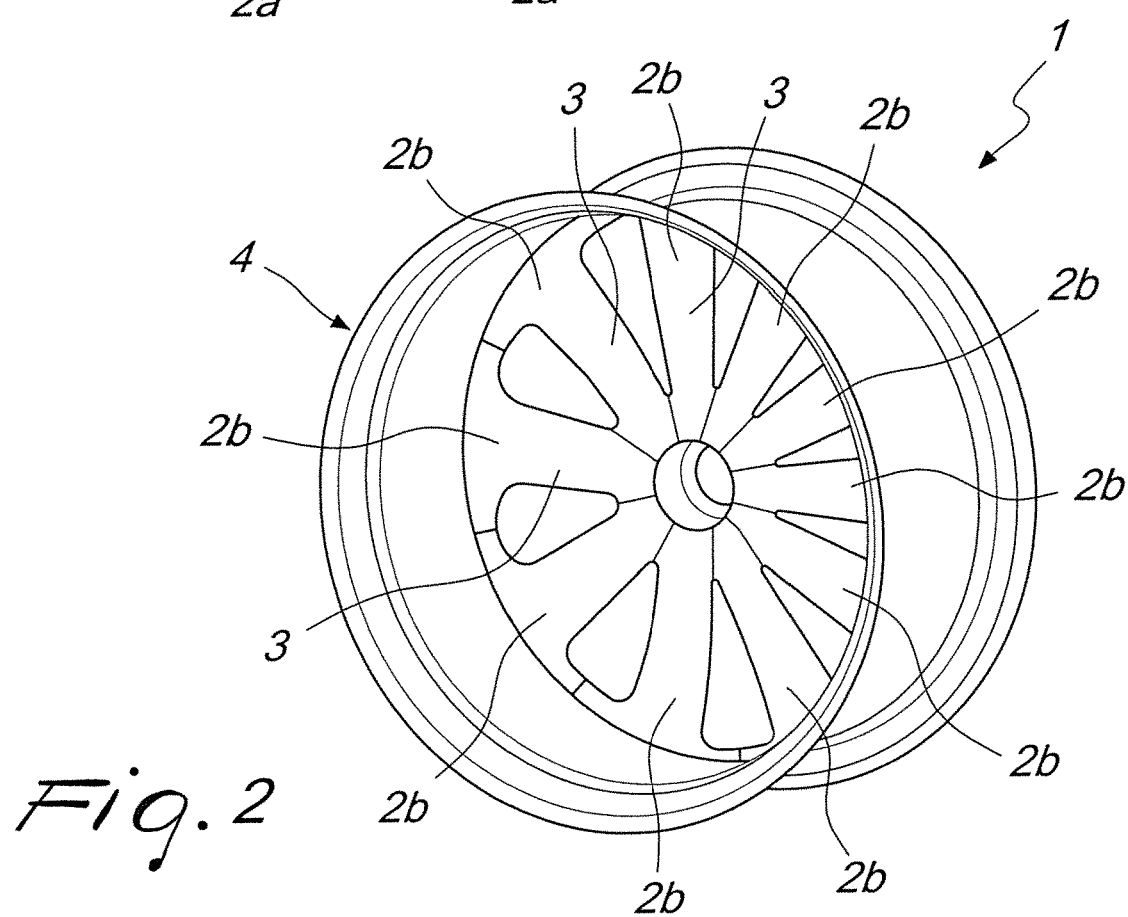
FIG. 2 is a rear perspective view of the wheel according to the disclosure.
Figure 3:
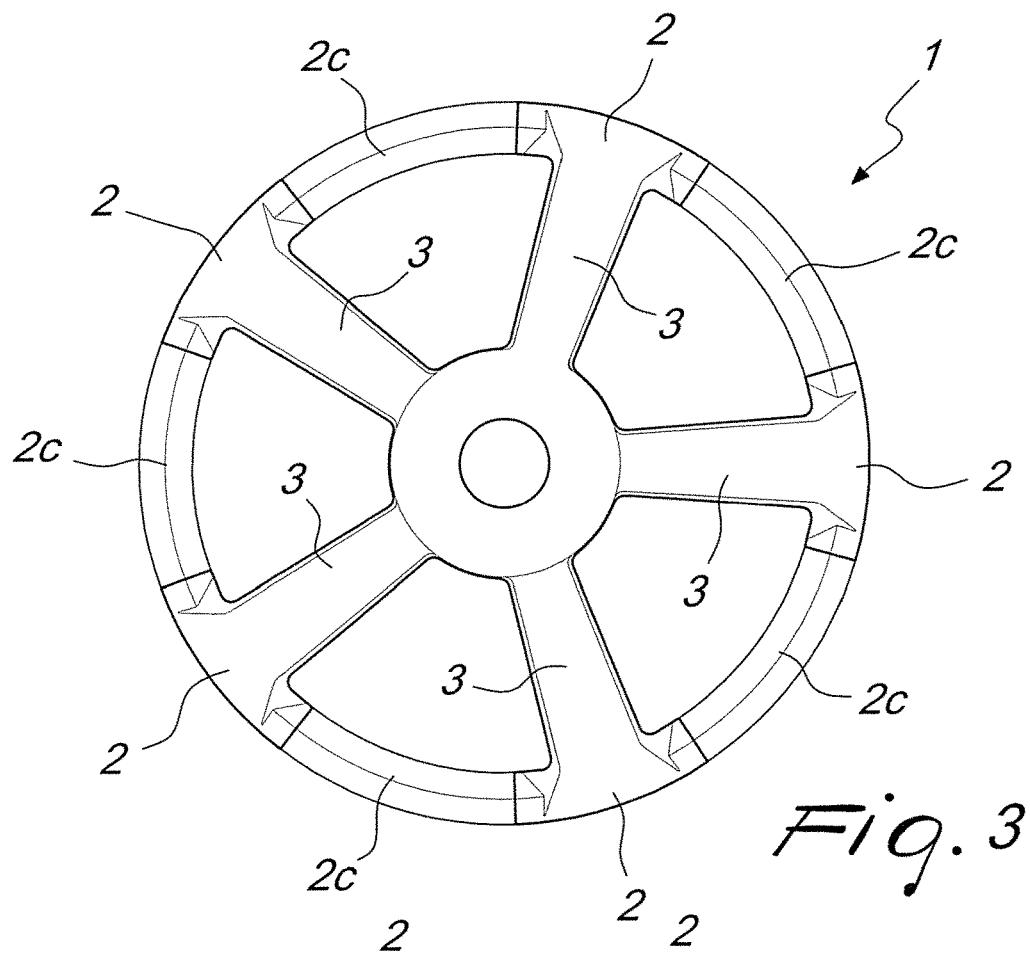
FIG. 3 is a front view of the wheel according to the disclosure.
Figure 4:
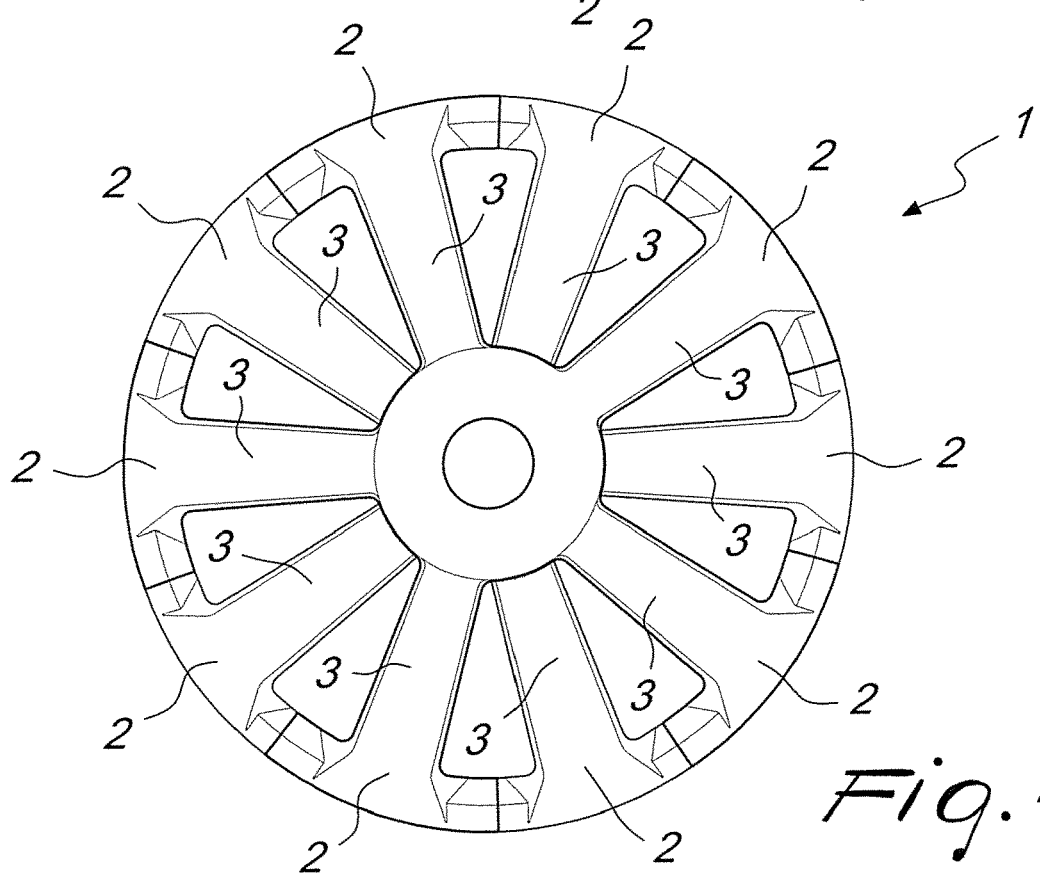
FIG. 4 is a front view of the wheel according to the disclosure.
Figure 5:
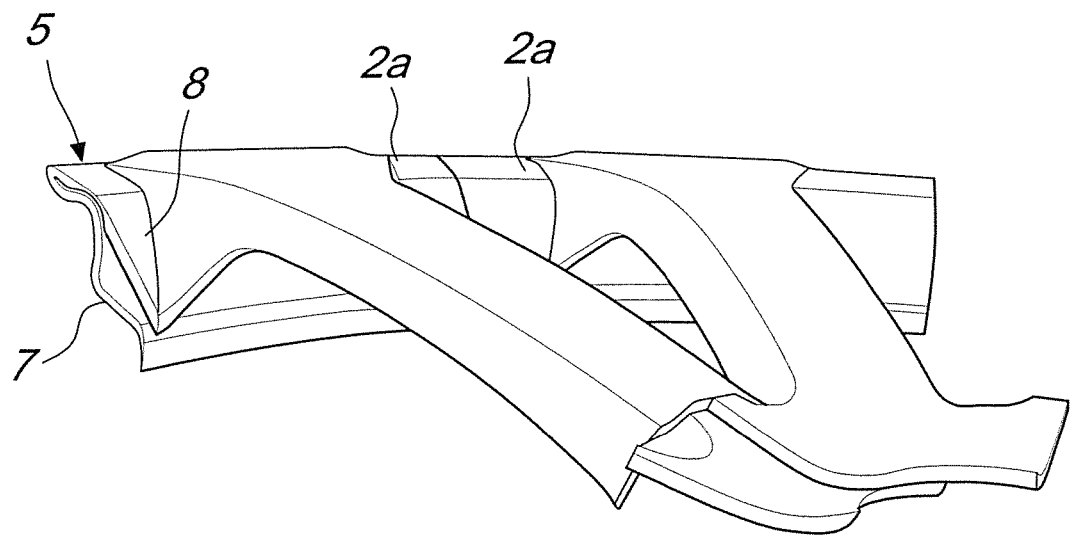
FIG. 5 is a perspective view of a portion of the wheel according to the disclosure.
Figure 6:
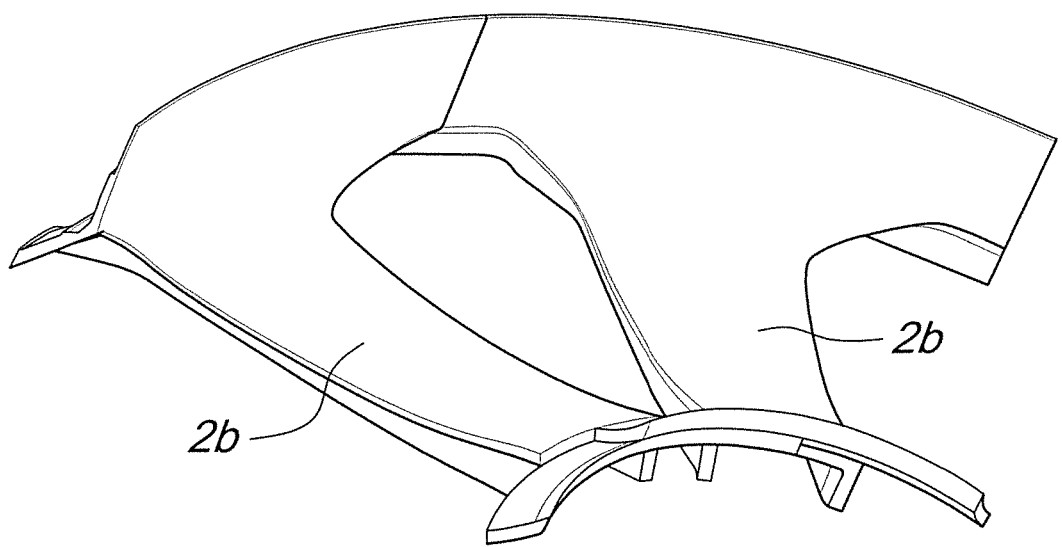
FIG. 6 is a perspective view of another portion of the wheel according to the disclosure.
Figure 7:
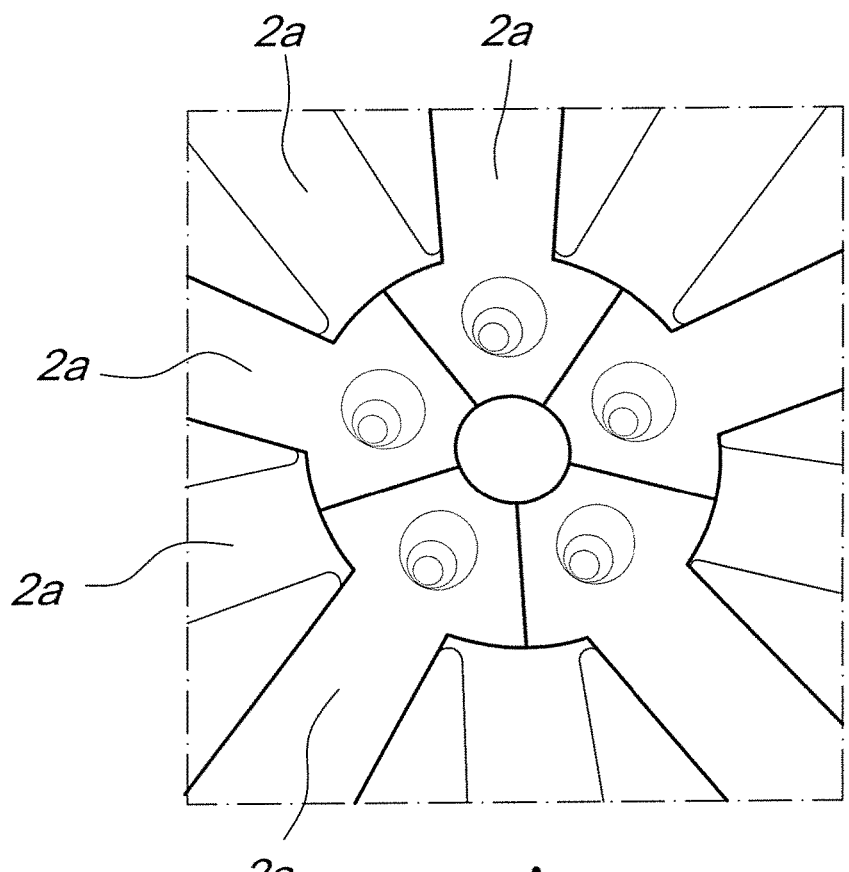
FIG. 7 is a front perspective view of a detail of the wheel according to the disclosure.
Figure 8:
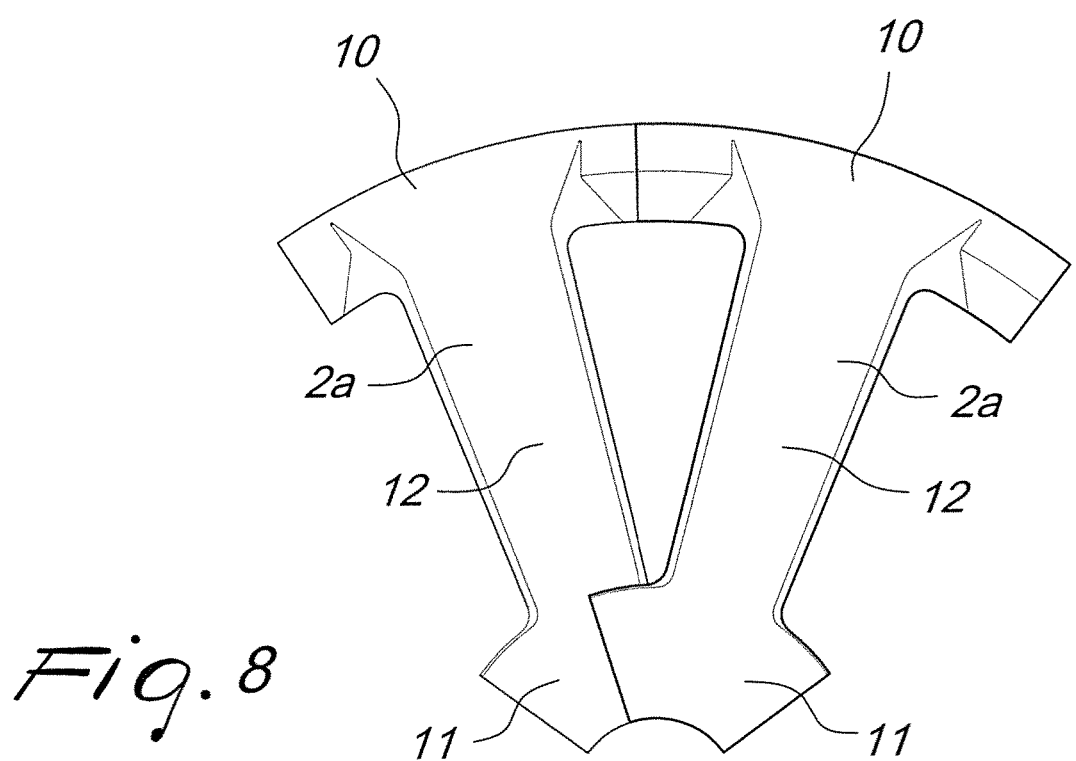
FIG. 8 is a front view of another portion of the wheel according to the disclosure.
Figure 9:
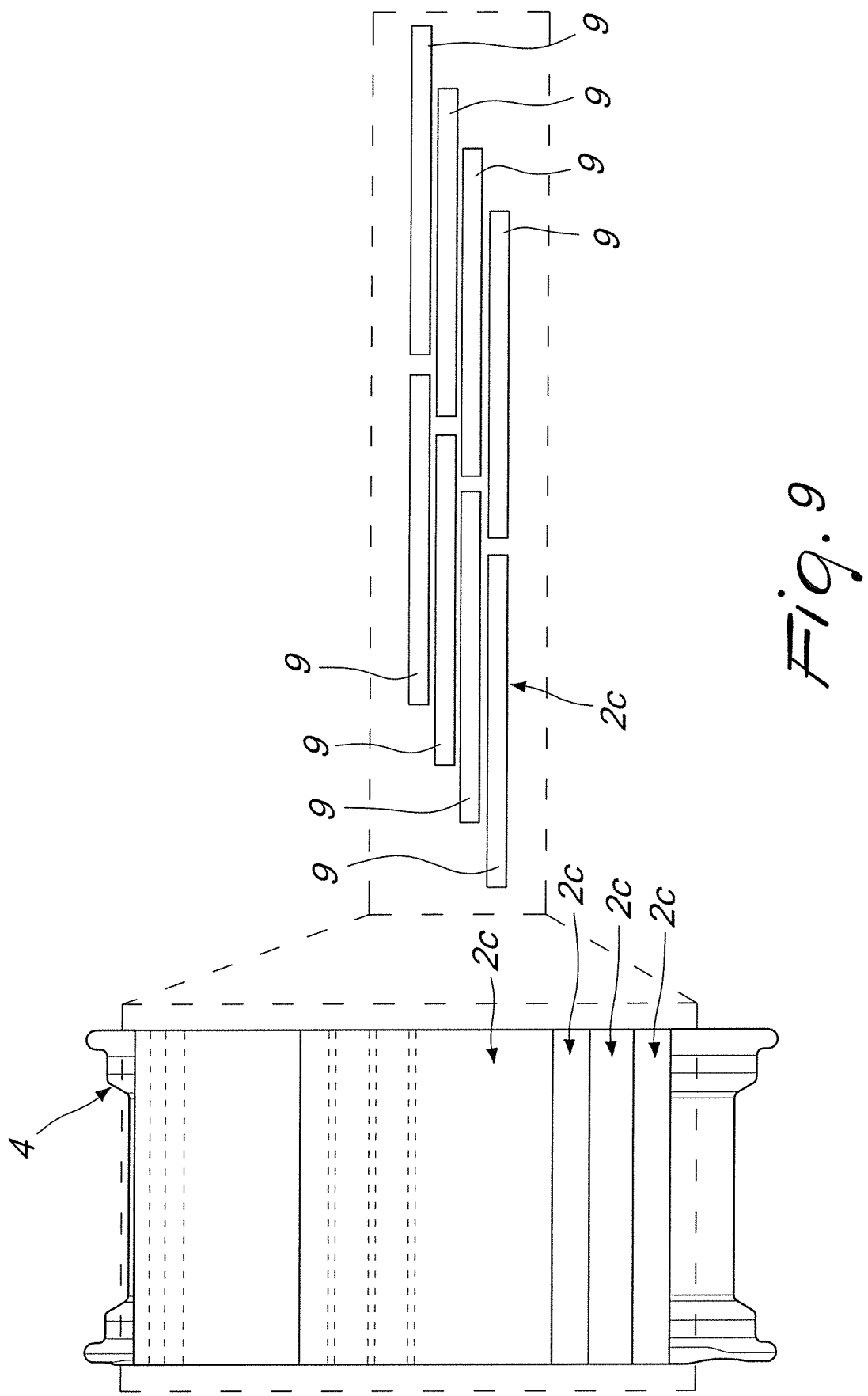
FIG. 9 is a schematic side view of the wheel according to the disclosure.

With reference to FIGS. 1-10, the reference numeral 1 generally designates a motor vehicle wheel according to the disclosure, i.e., made of composite material based on carbon fiber and manufactured with industrial criteria.

The method according to the disclosure for providing motor vehicle wheels 1 made of composite material based on carbon fiber includes a sequence of consecutive steps that are essentially summarized hereinafter.

First of all it is necessary to divide, during design, each wheel 1 into a plurality of portions 2 (which in turn can be divided into front spoke portions 2a, rear spoke portions 2b and tubular body portions 2c) having modest dimensions.

Each portion 2 (2a, 2b and 2c) must have modest dimensions (which correspond for example to a part of a spoke or an extent of the tubular body subtended by an angle with a breadth comprised between 10° and 150°) and has a simple shape.

In particular, each portion 2 (2a, 2b and 2c) must not have undercuts (or in any case comprise a minimal number thereof having a small extension) and must allow forming by molding or thermoforming in a simple manner.

Subsequently it is necessary to provide, with a raw material constituted mainly by carbon fibers having a predefined orientation, at least one first portion 2 (2a, 2b, 2c) the terminal edges of which are designed to mate with corresponding edges of at least one respective second portion 2 (2a, 2b, 2c) whose contour is conjugate and complementary with respect to the contour of the edges of the at least one respective first portion 2 (2a, 2b, 2c).

In order to obtain the wheel 1 according to the disclosure it is then necessary to mate the cited portions 2 (2a, 2b, 2c): this operation is normally performed within a sort of template, i.e., an assembly fixture, which allows to mate the portions 2 (2a, 2b, 2c) while maintaining the correct alignment and the ideal mutual juxtaposition. During this step of assembly, furthermore, the possibility is provided to interpose between the various portions 2 (2a, 2b, 2c) binders, optionally of the type that can be activated thermally, in order to facilitate adhesion among the various mated parts and the retention of the assembled shape during the handling operations that are needed to insert it in the mold.

The portions 2 (2a, 2b, 2c) previously mated and mutually arranged like the wheel 1 being provided must then be arranged within a respective mold, whose shape and dimensions are conjugate with respect to those of the wheel 1 to be manufactured.

Once the mutually mated portions 2 (2a, 2b, 2c) are arranged within the mold, it is then necessary to bring the mold and its contents to a predefined temperature: the temperature is generally high and is calculated as a function of the glass transition temperature (generally higher than this threshold) of the resin that will constitute the matrix of the composite being manufactured.

At this point, through appropriate filling channels, it is possible to inject a resin in the liquid state into the mold.

This resin is introduced at high pressure and at high temperature in order to ensure that complete and uniform diffusion thereof occurs in all the portions 2 (2a, 2b, 2c) and throughout all the interface surfaces between them.

This resin will constitute (once it has cross-linked completely) the matrix of the composite with which the wheel 1 is made.

In order to ensure that the introduced resin can solidify and cross-link correctly, it is necessary to maintain the pressure and the temperature of the mold (and of its content) within predefined ranges for a time interval required for the at least partial cross-linking of the resin.

Finally, it is then necessary to extract the wheel 1 from the mold.

If the resin has not completed its cross-linking process, the wheels 1 extracted from the molds might be arranged in curing areas, at which the processes for the consolidation of the resin may be completed (these areas might be outdoors and/or segregated in order to maintain predefined pressure, humidity and temperature conditions).

It is specified that each portion 2 (2a, 2b, 2c), if it is necessary to obtain specific mechanical performance or particular shapes or even only to speed up the preparation thereof, may comprise one or more inserts made of any material (for example polymeric films, metals, natural materials and others).

The method according to the disclosure provides for dividing during design each wheel 1 into a plurality of portions 2 (2a, 2b, 2c) having small dimensions and provides for dividing each spoke 3 into an outer portion 2a and an inner portion 2b thereof.

Likewise, a division of the substantially tubular body 4 for accommodating the tire into a plurality of portions 2c having a predefined extension is also provided.

It is deemed useful to specify that each external portion 2a of each spoke 3 comprises, at its region 5 designed to mate with a respective perimetric frame 6 of a portion 2c of the substantially tubular body 4, a lip 7 which is folded onto the end face 8 so as to form an accommodation recess for the perimetric frame 6 in the configuration for the mating of all the portions 2a and 2c.

It is specified that the carbon fibers designed to give the necessary structural rigidity and mechanical strength to the wheel 1 have a length comprised between 25 mm and 50 mm.

Furthermore, the possibility is not excluded to introduce additional short fibers, optionally concentrated at specific regions of each portion 2 (2a, 2b, 2c) with the goal of reducing further the deformations experienced by the specific component following the application of an external stress.

In order to obtain a finished wheel that has a particularly high performance and is therefore suitable to tolerate intense mechanical stresses, such as those that occur during the use of a sports car and/or during the use of a work vehicle, each individual portion 2 (2a, 2b, 2c) can advantageously comprise a plurality of layers 9 of fibers which are superimposed, known as skins, of different length.

At the perimetric edges of each portion 2 (2a, 2b, 2c), each layer 9 thus protrudes by a predefined quantity, so as to define a plurality of seats, between two protruding layers 9 arranged on an intermediate layer 9 that does not protrude, for subsequent mating, of a substantially imbricated type, with a respective additional portion 2 (2a, 2b, 2c) that is conjugate with respect to it.

In practice, the mating between contiguous portions 2 (2a, 2b, 2c) entails the insertion of the layers 9 that protrude from a first portion 2 (2a, 2b, 2c) in the seats formed between protruding layers 9 of a second portion 2 (2a, 2b, 2c), so that each seat of one portion accommodates a layer 9 of the other portion 2 (2a, 2b, 2c) and vice versa, forming a structural continuity of the composite material of which the wheel 1 is made.

It is deemed useful to specify for production purposes that each portion 2 (2a, 2b, 2c), constituted by carbon fibers and a polymeric binder (necessary to ensure preventive forming of each portion 2, 2a, 2b, 2c), is conveniently provided by arranging a plurality of layers of fibers and matrix which are mutually superimposed, with the optional interposition of expanded supports, within specific preforming primary molds.

In this manner it is possible to provide the individual shapes of each portion 2 (2a, 2b, 2c), using the polymeric binder (preferably present in minimal quantity) to ensure the retention of the shape assigned to each portion 2 (2a, 2b, 2c) by means of the preforming mold. During the final procedure for arranging the portions 2 (2a, 2b, 2c), mutually mated so as to form the wheel 1, within the mold and for injection of the thermosetting resin, the thermoplastic matrix used to give the shape to each portion 2 (2a, 2b, 2c) is dispersed within the thermosetting resin, giving the wheel the necessary dimensional stability and rigidity (generating a continuity among the fibers of the various superimposed layers 9 of the various portions 2, 2a, 2b, 2c).

The motor vehicle wheel 1 according to the disclosure is therefore of the type preferably made of composite material based on carbon fiber and provided with a plurality of substantially radial spokes 3 which are mated to a substantially tubular body 4 designed to accommodate the tire.

The wheel 1 is constituted by a plurality of distinct portions 2 (2a, 2b, 2c) the contiguous edges of which are mutually imbricated, i.e., arranged one above the other like the flat tiles of a roof.

As already described previously, the introduction of additional inserts is not excluded, both within the portions 2 (2a, 2b, 2c) or parts thereof, both during the assembly thereof at specific areas (for example metallic inserts at the region where the bolts for fixing the wheel 1 to the vehicle will have to be screwed).

The portions 2 (2a, 2b, 2c) are impregnated by a resin matrix that is distributed uniformly without discontinuity throughout the volume of the wheel 1.

It is specified that the resin matrix is constituted by a thermosetting resin of the type chosen preferably among epoxy resins, polyurethane resins, polyphenol resins, aramid resins, polyamide resins, polyester resins, melamine resins, alkyd resins and the like.

It is specified furthermore that the wheel 1 according to the disclosure comprises a number of spokes 3 that is not smaller than three.

Each spoke 3 has a substantially radial direction and a shape that is preferably chosen among prism-like, cylindrical, frustum-like, truncated pyramid-like and combinations thereof. In any case, the provision of spokes 3 having an imaginary shape that does not directly descend from the ones listed above is not excluded.

In order to identify precisely the characteristics of the wheel 1 according to the disclosure, it is specified that each first portion 2 (2a, 2b, 2c) is constituted validly by a plurality of superimposed layers 9 of fibers which have a different surface extension.

In practice, each layer 9 has a different protrusion of the corresponding edges with respect to the contour of the first portion 2 (2a, 2b, 2c) itself, for imbricated mating with at least one respective second portion 2 (2a, 2b, 2c) that is contiguous and has conjugate shapes and dimensions.

Each band that protrudes from the respective portion 2 (2a, 2b, 2c) of each layer 9 is therefore accommodated within a corresponding seat (conjugate cavity) provided in the contiguous portion 2 (2a, 2b, 2c), which is designed to be mated therewith during the assembly of the wheel 1. The presence of a plurality of protruding layers 9 and of seats (which are interposed and formed between two protruding layers 9) in each portion 2 (2a, 2b, 2c) entails a coupling mating of each portion 2 (2a, 2b, 2c) with the contiguous one. This mating with mutual coupling (imbricated), appropriately consolidated by the matrix constituted by the thermosetting resin injected into the mold, gives the wheel 1 according to the disclosure an extremely high structural rigidity, making it perfectly suitable to tolerate the intense mechanical stresses that are generated during the operation of motor vehicles (on which the wheels 1 will be installed to support the tires).

By way of example, some possible embodiments related to specific wheels 1 and/or specific types of portions 2 (2a, 2b, 2c) are described hereinafter.

In particular, it is pointed out that it is certainly appropriate for each portion 2a, 2b designed to constitute a spoke 3 to comprise respective heads 11 (the one proximate to the central axis of the wheel 1) and 10 (the peripheral one) which are wider than the central post 12.

The head 11 that is proximate to the rotation axis of the wheel 1 preferably comprises a contoured terminal plate: the contour is such as to ensure that each plate is partially superimposed on the contiguous ones (the one that precedes it and the one that follows it), so as to ensure structural continuity (once the complete impregnation with resin that will have diffused within all the portions 2, 2a, 2b, 2c has been completed). The peripheral head 10 is different if one refers to outer portions 2a or inner portions 2b.

It has already been shown that the outer portion 2a comprises a lip 7 that is folded onto the terminal face 8 so as to form a recess: the lateral terminal edges of the terminal face 8 and the lip 7 may in turn be partially superimposed on the ones of the contiguous portions 2a, in order to increase the rigidity of the wheel 1.

In any case, the recess accommodates a respective perimetric frame 6 of a portion 2c of the substantially tubular body 4 so as to provide a continuous structural continuity with the portion 2c: in this case also, the diffusion of the resin matrix ensures the perfect cohesion of the distinct portions 2a, 2b, 2c which are mutually engaged and/or superimposed, ensuring the necessary mechanical performance of the wheel 1.

Finally, it is specified that the portions 2c designed to constitute the substantially tubular body 4 also have contoured perimetric edges so as to be partially superimposed during assembly: in particular, each portion 2c is partially superimposed on the one that follows it and on the one that precedes it in the tubular body 4 and all the portions 2c further have the perimetric frame 6 inserted within the recess formed between the lip 7 and the terminal face 8 of respective portions 2a.

Furthermore, in a lower region each portion 2c may comprise, in a configuration that is at least partially superimposed on a perimetric band of its face that is internal to the wheel 1, a portion of the contour of a head 10 of an internal portion 2b.

The overlap of the perimetric areas of each portion 2, 2a, 2b, 2c, in combination with the insertion of each layer 9 that protrudes from the perimeter of each first portion 2, 2a, 2b, 2c into at least one respective seat of at least one respective second portion 2, 2a, 2b, 2c causes a substantial continuity of the carbon fiber among all the portions 2, 2a, 2b, 2c.

The consequence of this continuity (once complete uniform diffusion of the resin has occurred following the injection thereof in the mold) is the forming of a wheel 1 (in output from said mold after the cross-linking of the resin) with a mechanical performance and structural rigidity that are similar to those of a handcrafted composite wheel (eliminating however the high costs due to the high contribution of specialized labor that characterizes this latter type).

Advantageously, the present disclosure solves the problems described previously, proposing a method for providing motor vehicle wheels 1 made of composite material based on carbon fiber of a completely industrialized type: this ensures that the production costs are kept within substantially modest thresholds and allows to start large-scale production (both listed advantages are not compatible with the handcraft production of wheels made of composite material, which until now was the only possibility of production for these components).

Validly, the method for providing wheels 1 according to the disclosure entails a minimal contribution of specialized labor, defining a series of steps that are simple to implement.

Conveniently, the method for providing wheels 1 according to the disclosure ensures high constancy of the mechanical properties and dimensions of each production batch: therefore, the typical risks of handcraft production, in which the characteristics of the article are dependent upon the skill of the operator who manufactured it, are avoided.

Usefully, the motor vehicle wheels 1 made of composite material based on carbon fiber according to the disclosure have a distinctly modest weight and therefore can have a higher performance than alloy wheels (magnesium alloys and aluminum alloys) which are heavier, and which therefore introduce more significant inertial phenomena in the dynamics of the vehicle in which they are installed.

Efficiently, the motor vehicle wheels 1 according to the disclosure have a high rigidity and optimum mechanical performance.

Favorably, the method for providing motor vehicle wheels according to the disclosure allows to ensure high productivity, by virtue of the simplification of the operations for providing the portions 2 (2a, 2b, 2c), which are particularly simple and can be provided within primary preforming molds.

Advantageously, the method for providing motor vehicle wheels 1 and the corresponding wheels 1 are simple to implement and provide in practice, also in view of relatively modest costs: these characteristics make the method and the wheel 1 according to disclosure technical innovations of assured application.

The disclosure thus conceived is susceptible of numerous modifications and variations, all of which are within the scope of the appended claims; all the details may furthermore be replaced with other technically equivalent elements.

In the exemplary embodiments shown, individual characteristics, given in relation to specific examples, may actually be interchanged with other different characteristics that exist in other exemplary embodiments.

In practice, the materials used, as well as the dimensions, may be any according to the requirements and the state of the art.

The invention claimed is:

1. A method for providing motor vehicle wheels made of composite material based on carbon fiber, the method including the following steps:
   dividing, during design, each wheel into a plurality of portions having small dimensions,
   providing, with a raw material constituted mainly by carbon fibers with a predefined orientation, at least one first portion with terminal edges configured to mate with corresponding edges of at least one respective second portion that has a contour that is conjugate and complementary with respect to the contour of the edges of the at least one respective first portion,
   mating said portions and arranging said portions subsequently within a respective mold whose shape and dimensions are conjugate with respect to those of the wheel to be manufactured, wherein the contiguous edges of said portions are mutually imbricated such that the distinct portions are arranged to overlap in sequence wherein at least three contiguous distinct portions are arranged such that one of the distinct portions is interposed between the other adjacent distinct portions,
   bringing the mold and contents of the mold to a predefined temperature,
   injecting a resin in liquid state into the mold, said resin being injected at high pressure and high temperature for diffusing in all the portions and through all the interface surfaces between the portions, forming the matrix of the composite that constitutes the wheel,
   maintaining the pressure and temperature of the mold within predefined ranges for a time interval required for the at least partial cross-linking of the resin, and
   extracting the wheel from the mold.

2. The method according to claim 1, wherein the dividing of each wheel into a plurality of portions having small dimensions entails dividing each spoke into an outer portion and an inner portion, and dividing of the substantially tubular body for accommodating the tire into a plurality of portions having a predefined extension.

3. The method according to claim 2, wherein each outer portion of each spoke comprises, at a region configured to mate with a respective perimetric frame of a portion of the substantially tubular body, a lip folded onto the terminal face so as to form an accommodation recess for said perimetric frame in the configuration for mating all of the portions.

4. The method according to claim 1, wherein said carbon fibers have a length comprised between 25 mm and 50 mm.

5. The method according to claim 1, wherein each said portion comprises a plurality of superimposed fiber layers, termed skins, which have a different length, at the perimetric edges of each portion each layer protruding by a predefined quantity so as to form a plurality of seats, between two protruding layers arranged on an intermediate non-protruding layer, for their subsequent mating, of a substantially imbricated type, with a respective further portion that is conjugate with respect to it.

6. The method according to claim 1, wherein each portion constituted by carbon fibers and a polymeric binder is provided by arranging a plurality of layers of fibers and matrix which are superimposed, with the optional interposition of expanded supports, within specific preforming primary molds.

* * * * *